United States Patent [19]

Limburg

[11] Patent Number: 4,734,684

[45] Date of Patent: Mar. 29, 1988

[54] DEVICE AND METHOD FOR USE IN ADJUSTING THE DISTANCE BETWEEN TWO PARALLEL SURFACES

[75] Inventor: Jilles M. Limburg, Venlo, Netherlands

[73] Assignee: Oce-Nederland B.V., Venlo, Netherlands

[21] Appl. No.: 935,243

[22] Filed: Nov. 26, 1986

[30] Foreign Application Priority Data

Dec. 6, 1985 [NL] Netherlands .......................... 8503363

[51] Int. Cl.$^4$ ............................................. C08B 21/00
[52] U.S. Cl. .................................... 340/686; 340/540; 340/665
[58] Field of Search .................... 340/686, 665, 540

[56] References Cited

U.S. PATENT DOCUMENTS 3,945,704  3/1976  Kraus et al. .......................... 340/665

Primary Examiner—Glen R. Swann, III

Attorney, Agent, or Firm—Reed Smith Shaw & McClay

[57] ABSTRACT

The present invention provides a compressible sensor for use in adjusting the distance between two parallel surfaces until the distance is within predetermined limits or tolerances. The sensor includes an electrically insulating flat support having two separated electrodes on each side thereof, two resiliently deformable members of different resilient deformabilities each one located between the two separated electrodes and contacting one side of the electrically insulating flat support, and two electrically conductive members each in contact with one of the resiliently deformable members. Each electrically conductive member extends over the two separated electrodes so that it can establish an electrical connection with either separated electrode when the resiliently deformable member is compressed. A signaling circuit is used to determine which electrodes are electrically connected and detects when the distance between the two parallel surfaces is within the accepted tolerances.

6 Claims, 3 Drawing Figures

DEVICE AND METHOD FOR USE IN ADJUSTING THE DISTANCE BETWEEN TWO PARALLEL SURFACES

FIELD OF THE INVENTION

The present invention relates to a device and method for use in adjusting the distance between two parallel surfaces within predetermined limits.

BACKGROUND OF THE INVENTION

There are various technical areas in which it is necessary to reliably adjust a fairly small distance between two parallel surfaces. One example can be found in U.S. Pat. No. 4,168,522, which relates to a copying machine exposure device in which an original is conveyed between two flat glass plates. To avoid imaging errors, the original must be kept flat between the glass plates, with little freedom of movement in the direction perpendicular to the direction of conveyance. This requires accurate adjustment of the small distance between the two glass plates within close tolerances.

There are various devices for measuring the small distance between two parallel surfaces. For example, French patent application No. 2,309,833 shows a sensing device based on the capacitive principle. U.S. Pat. No. 3,239,938 shows a sensing device working with a strain gage while U.S. Pat. No. 3,225,294 shows a sensing device using the application of eddy-currents and measuring the reaction. None of these devices results in a compactly constructed device which is easy to handle.

Other references, while not showing a device for measuring the small distance between two parallel surfaces, show a push button switch containing resiliently deformable elements. For example, French patent application No. 2,189,848 and German patent application No. 3,300,186 show a push button switch which is able to make several contacts sequentially in time while French patent application No. 2,441,259 and British PTO patent application No. WO84/03172 show a push button switch that can make several contacts at the same time.

It would be desirable to have a device for use in adjusting the distance between two parallel surfaces which is compactly constructed and is simple to handle.

SUMMARY OF THE INVENTION

Generally, the present invention provides a device for use in adjusting the distance between two parallel surfaces until the distance is within predetermined limits or tolerances, comprising: (a) an electrically insulating flat support having two separated electrodes on each side, one of the electrodes on each side being able to be connected to an electrical voltage source; (b) two resiliently deformable members having different resilient deformability from one another, each one being in contact with one side of the electrically insulating flat support in an area not covered by the two electrodes and projecting past the electrodes in a direction perpendicular to the plane of the electrically insulating flat support; (c) two electrically conductive members each in contact with one of the resiliently deformable members and extending over the two electrodes on one side of the electrically insulating flat support so that it can establish an electrical connection between the two electrodes when the resiliently deformable member is deformed by compression; and (d) a signaling circuit which signals when no electrodes are electrically connected, when one pair is electrically connected and when both pairs are electrically connected.

In the present invention, the difference in resilient deformability between the two resiliently deformable members can be obtained by using different thicknesses of the same resiliently deformable material for the two members. It also can be obtained by making the two members of the same thickness but using materials having different deformabilities. Alternatively, the two members can be made of different materials having different thicknesses to obtain the difference in resilient deformability.

The present invention is very suitable for a service engineer to use as an adjustment aid since it enables him easily and reliably to adjust the distance between any two surfaces even if they are in a machine and are difficult to reach. The sensor is subjected to compression between the two parallel surfaces while the signaling circuit detects when the distance between the parallel surfaces is within the accepted tolerances.

Other features and advantages of the present invention will be apparent from the following detailed description and the accompanying drawings of a presently preferred embodiment of the best mode of carrying out the invention.

DESCRIPTION OF THE PREFERRED EMBODIMENT

Figure 1:
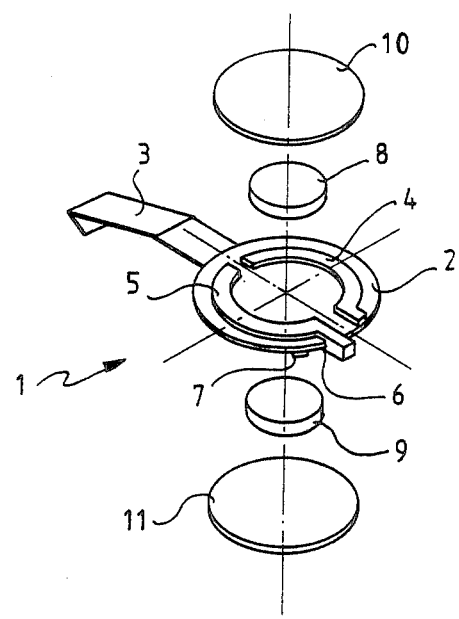
FIG. 1 shows the parts of a device according to the present invention.

As shown in FIG. 1, the present invention has a sensor pack 1 consisting of an electrically insulating baseplate 2 with a handle 3 and a number of elements provided on either side of baseplate 2 which will be described hereinafter.

Two electrodes 4, 5 and 6, 7, respectively are provided on each side of baseplate 2 such as in the form of copper tracks. Electrodes 4 and 5 are separated from one another, and so are electrodes 6 and 7. Electrodes 5 and 6 are interconnected and can be connected to a low voltage electrical source (such as 12 V) which is not shown. The other two electrodes, 4 and 7, are each connected via a signal line (not shown) to a signaling circuit, which will be described hereinafter.

A resiliently deformable member 8 is provided between the pair of electrodes 4 and 5 and can be secured to baseplate 2, for example, by glue. Similarly, resiliently deformable member 9 is provided between the pair of electrodes 6 and 7. Members 8 and 9 may be made of any known resiliently deformable material such as foam rubber. Electrically conductive plates 10 and 11, respectively, are provided on that side of resiliently deformable member 8 and 9, respectively, which is remote from baseplate 2. Electrically conductive plates 10 and 11 can be secured to member 8 and 9, respectively, by a glued connection, for example. Electrically conductive plate 10 projects beyond or past member 8 and above electrodes 4 and 5 while plate 11 projects beyond or past member 9 and above electrodes 6 and 7.

As a result electrically conductive plate 10 and 11, respectively, can establish an electrical connection between electrode pairs 4, 5 and 6, 7 respectively, when resiliently deformable members 8 and 9, respectively, are deformed by compression.

The thickness of resiliently deformable members 8 and 9 are such that in the noncompressed state electrically conductive plates 10 and 11, respectively, are disengaged from electrode pairs 4, 5 and 6, 7 respectively.

Figure 2:
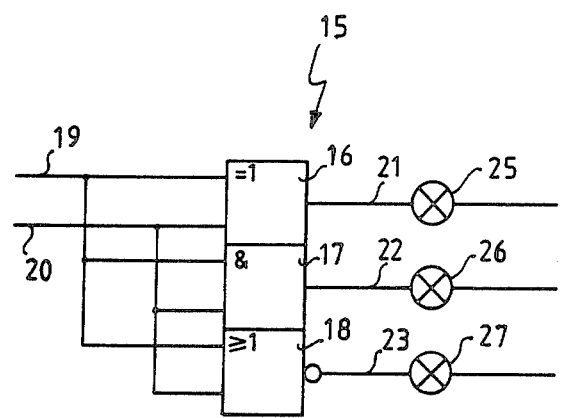
FIG. 2 is a block circuit diagram of the electrical signaling circuit for a device according to the present invention.

FIG. 2 shows one possible embodiment of a signaling circuit for use in a device according to the present invention. Gate circuit 15 consists of three logic gates each having two inputs. The logic gates are an exclusive OR gate 16, an AND gate 17 and a NOR gate 18. The two inputs of gates 16, 17, 18 are connected to signal lines 19 and 20, which are in turn each connected to one of each of the pairs of electrodes of sensor pack 1. Preferably signal lines 19 and 20 are connected to electrodes 4 and 7, respectively.

Depending upon the voltage level of outputs 21, 22, 23 of gates 16, 17, 18, respectively, signaling elements in the form of lamps are or are not actuated. Any one of a variety of elements known from the art can be used as signaling elements, such as incandescent lamps, LED's, LCD's or even acoustic signal sources.

In addition to the embodiment of the signaling circuit described above, it is possible of course to use any other suitable embodiment, whether a logic circuit, or a microprocessor provided with a suitable program, to translate the output voltages of electrodes 4 and 7 into the required signal.

Sensor pack 1, including a signaling circuit such as 15, comprises a device which is intended as an aid in the adjustment of the distance between two parallel surfaces to within predetermined limits. This means that not just one specific distance, but any distance between a minimum and a maximum value, must be regarded as a correct distance. To satisfy this condition, only one pair of electrodes, either 4 and 5 or 6 and 7, can be connected via its corresponding electrically conductive plate 10 or 11 upon compression of sensor pack 1 while the other pair of electrodes is not connected via the other electrically conductive plate until further compression of sensor pack 1.

The dimensions of the various parts of sensor pack 1 must be selected such that in the situation where only one pair of electrodes is connected, the thickness of compressed sensor pack 1 corresponds to the maximum value of the required distance between the two surfaces. As the compression of sensor pack 1 increases, the thickness of the compressed pack at the time when both pairs of electrodes 4, 5 and 6, 7 are connected by electrically conductive plates 10 and 11, respectively, must correspond to the minimum value of the required distance between the two surfaces.

For the device described herein to be able to signal when the distance is within the specified tolerances, there must be a difference in the deformability of resiliently deformable members 8 and 9. The difference in the deformability of members 8 and 9 can be obtained by a difference in the thicknesses of members 8 and 9 or by selecting materials for these members which have different deformability characteristics. The magnitude of the difference in deformability and hence the magnitude of the tolerance range is obtained by a suitable difference in thickness between members 8 and 9 or a suitable selection of different material for each, or a combination of both.

Figure 3:
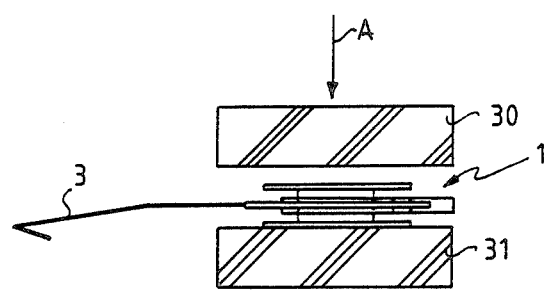
FIG. 3 shows a device according to the present invention as it is used in adjusting the distance between two surfaces.

FIG. 3 indicates generally how a specific distance between two surfaces 30 and 31 can be adjusted using the device according to the present invention. Sensor pack 1 is pushed into the space between surfaces 30 and 31 using handle 3. By way of example, it will be assumed that surface 31 is fixed and surface 30 is displaceable in the direction of arrow A and in the opposite direction by various means known in the art.

From the time when surface 30 comes into contact with sensor pack 1, sensor pack 1 is increasingly more strongly compressed by the application of pressure. The pressure on sensor pack 1 is initially not yet sufficient for one of the resiliently deformable members, either 8 or 9, to be deformed to such an extent that one of the pair of electrodes, either 4, 5 or 6, 7, is connected via either plate 10, or 11 respectively. Consequently no signal voltage is present at inputs 19 and 20 of gate circuit 15, so that a voltage is applied only at output 23 via NOR gate 18, thus lighting lamp 27. As long as lamp 27 is illuminated, it means that the distance between surfaces 30 and 31 must still be considered excessive and outside the predetermined limits.

When the maximum value of the distance between surface 30 and 31 is reached, one of the pairs of electrodes, either 4, 5 or 6, 7, is connected so that one of the inputs, either 19 or 20, of gate circuit 15 carries a signal and the other does not. This results in the situation that only output 21 of exclusive OR gate 16 receives a voltage so that signal lamp 25 is lit indicating that the distance between surfaces 30 and 31 is within the predetermined tolerances.

This state of signaling circuit 15 of FIG. 3 is maintained until the minimum value of the distance between surfaces 30 and 31 is reached. Further compression of sensor pack 1 results in both pairs of electrodes 4, 5 and 6, 7 being connected so that both signal lines 19 and 20 carry voltage. As a result, the voltage level at the output of exclusive OR gate 16 again becomes zero, while voltage now occurs at the output of AND gate 17. This results in the indication, via signal lamp 26, that the distance between surfaces 30 and 31 has become too small.

Finally, when it has been established that the distance between the surfaces is within the tolerance limits, the position of surfaces 30 and 31 with respect to one another can be fixed by various means known from the art.

As described above, the device according to the present invention provides an excellent aid for use in adjusting within prdetermined limits the distance between two parallel surfaces. The signaling circuit indicates in any situation whether the distance between the surfaces is excessive, inadequate or correct.

While presently preferred embodiments of the invention have been shown and described with particularity, the invention may be otherwise embodied within the scope of the appended claims.

What is claimed is:

1. A device for use in adjusting within predetermined limits the distance between two parallel surfaces comprising:
   (a) an electrically insulating flat support having two separated electrodes on each side, one of the electrodes on each side being able to be connected to an electrical voltage source;
   (b) two resiliently deformable members having different resilient deformability from one another, each one being in contact with one side of the electrically insulating flat support in an area not covered by the two electrodes and projecting past the electrodes in a direction perpendicular to the plane of the electrically insulating flat support;

(c) two electrically conductive members, each one in contact with one of the resiliently deformable members and extending over the two electrodes so that each can establish an electrical connection between the two electrodes when the resiliently deformable member is deformed by compression; and (d) a signaling circuit which signals when no electrodes are connected, when one pair is connected, or when both pairs are connected.

2. A device as described in claim 1 wherein the resiliently deformable members are of different thicknesses.

3. A device as described in claim 1 wherein the resiliently deformable members each consist of a material which differs with respect to its resilient deformability.

4. A method of adjusting within predetermined limits the distance between two parallel surfaces, comprising the steps of placing a device as described in claim 1 between two parallel surfaces and moving the two surfaces with respect to one another until the signaling circuit of the device signals that only one pair of electrodes is connected.

5. A method of adjusting within predetermined limits the distance between two parallel surfaces, comprising the steps of placing a device as described in claim 2 between two parallel surfaces and moving the two surfaces with respect to one another until the signaling circuit of the device signals that only one pair of electrodes is connected.

6. A method of adjusting within predetermined limits the distance between two parallel surfaces, comprising the steps of placing a device as described in claim 3 between two parallel surfaces and moving the two surfaces with respect to one another until the signaling circuit of the device signals that only one pair of electrodes is connected.

* * * * *

UNITED STATES PATENT AND TRADEMARK OFFICE
CERTIFICATE OF CORRECTION

PATENT NO. : 4,734,684

DATED : March 29, 1988

INVENTOR(S) : Limburg

It is certified that error appears in the above-identified patent and that said Letters Patent is hereby corrected as shown below:

Column 1, line 28: please delete --gage-- and insert "gauge" therefor.

Column 2, line 62: please delete --member-- and insert "members" therefor.

Column 2, line 64: please delete --member-- and insert "members" therefor.

Column 3, line 1: please delete --plate-- and insert "plates" therefor.

Column 4, line 26: please delete --surface-- and insert "surfaces" therefor.

Signed and Sealed this

Sixth Day of September, 1988

Attest:

DONALD J. QUIGG

*Attesting Officer*   *Commissioner of Patents and Trademarks*